Z. A. MEREDITH.
CORNET.
APPLICATION FILED DEC. 4, 1901.
939,285.
Patented Nov. 9, 1909.
2 SHEETS—SHEET 2.
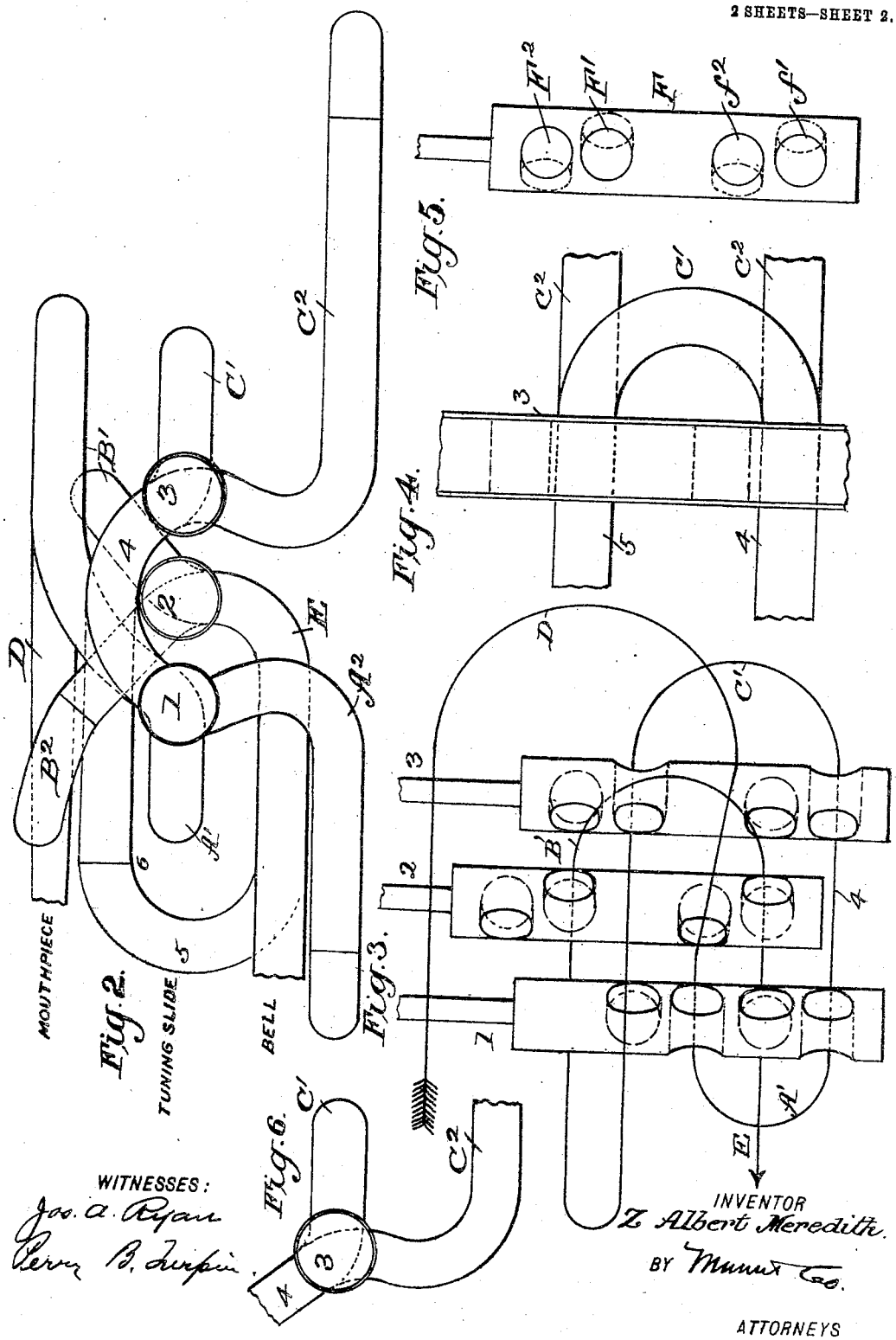
WITNESSES:
INVENTOR
Z. Albert Meredith.
BY
ATTORNEYS

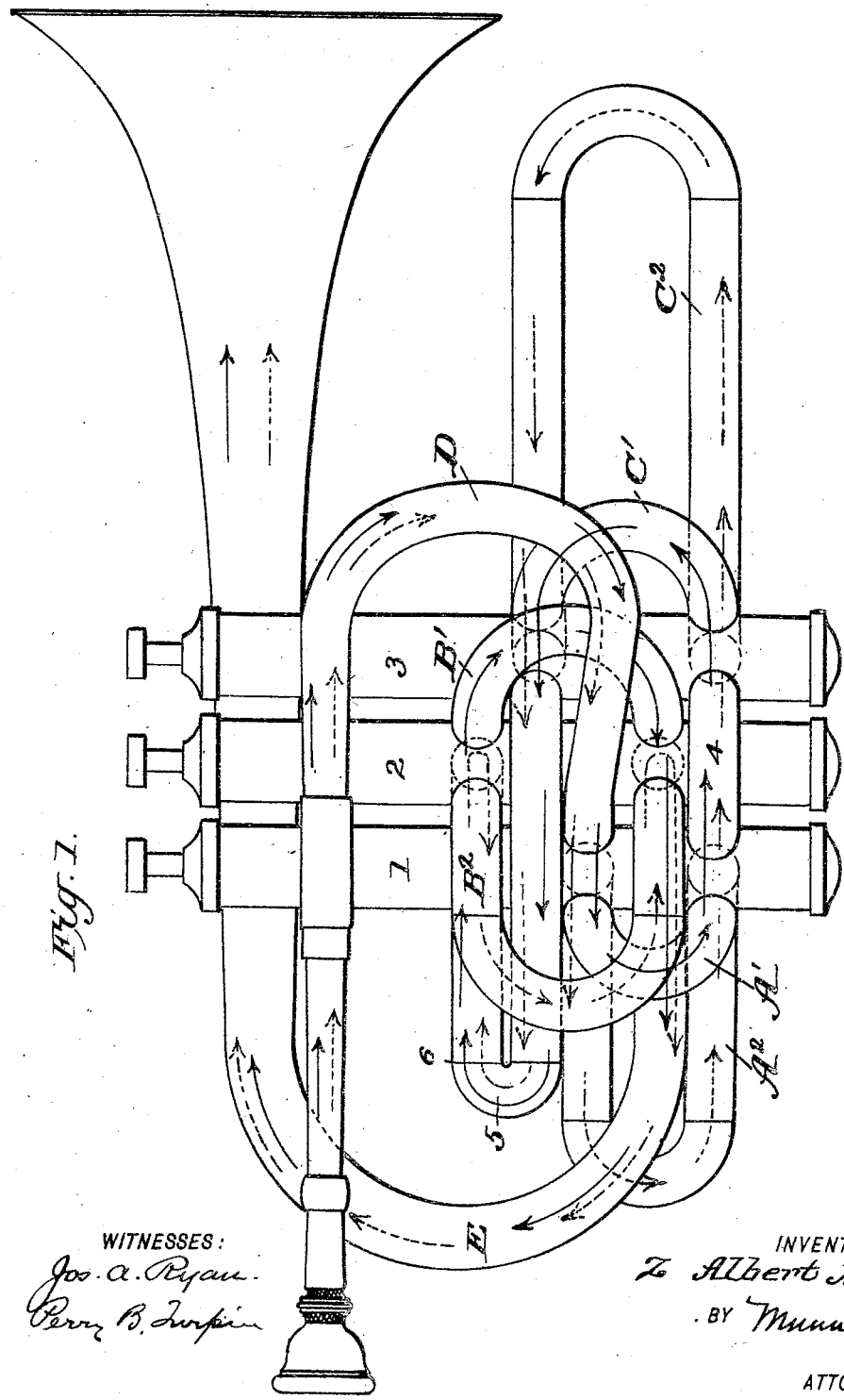

UNITED STATES PATENT OFFICE.

Z ALBERT MEREDITH, OF ELKHART, INDIANA.

CORNET.

939,285.  Specification of Letters Patent.  Patented Nov. 9, 1909.

Application filed December 4, 1901. Serial No. 84,680.

*To all whom it may concern:*

Be it known that I, Z ALBERT MEREDITH, a citizen of the United States, residing at Elkhart, in the county of Elkhart and State of Indiana, have made certain new and useful Improvements in Cornets, of which the following is a specification.

My invention relates to cornets and wind instruments of a similar character. In instruments of this type, a column of air passing through the tubing vibrates both as a whole and in sections. Any interference with the vibration of this column of air in the tubing alters the tone produced thereby and any resistance offered to its passage through the tubing increases the effort necessary to sound that tone. Instruments as constructed heretofore have contained short or angular bends in the wind passage which interfered with the vibrations of the air column to such an extent as to materially detract from the quality of the tone in some one or more of the positions of the valves. These short or angular bends were usually caused by an inclined port in one of the valve pistons, each of which inclined ports formed in the wind passage two angular bends. Many efforts have been made to eliminate these inclined ports in the valve pistons and to thereby eliminate the short or angular bends in the wind passage of the instrument, but makers have heretofore been unable to so construct an instrument as to eliminate all of these angular bends, it having been found necessary in every instance to produce, at least, one inclined port in one or more of the valve pistons. These short or angular bends not only detract from the quality of the tone of the instrument, but cause a lack of uniformity in the effort required on the part of the player to blow the instrument, inasmuch as the resistance offered to the passage of the wind through the tubing is greater when the valve or valves were in such a position as to include the inclined port than is the resistance offered by some other arrangement of the ports. This lack of uniformity of effort rendered the instrument difficult to play, as the different tones required a constant change in the effort on the part of the player.

The object of the present invention is to provide an instrument which will be so constructed that the wind passages will offer a minimum amount of resistance to the passage of the wind therethrough and will offer a minimum amount of interference to the vibrations of the column of air therein, thus producing a tone of a high quality and enabling the instrument to be played with a uniform effort on the part of the player.

To this end, a further object of the invention is to provide an instrument which shall contain no short or angular bends, each bend being so constructed, according to acoustical principles, as to change the direction of a column of wind with the least possible resistance and the least possible interference with the vibrations thereof; to so construct and arrange the several parts of the instrument that the ports in the valve pistons, which connect the several tubings, will each have its axis in a plane extending at right angles to the direction of the length of the valve piston in which it is formed and will lie in the same horizontal plane with the ends of the tubings which are to be connected thereby; and further, to so improve the construction and arrangement of the several parts of the instrument as to provide a practical instrument of small size and of a high degree of efficiency.

With these objects in view my invention consists in certain novel features and in certain combinations and arrangements of parts hereinafter to be described, and then more particularly pointed out in the claims.

In the accompanying drawings, Figure 1 is a side elevation of a cornet embodying my invention, on which I have indicated in full line arrows the passage of the wind in the open position of the valves or when all the valves are elevated, and in dotted line arrows I have indicated the passage of the air when all the valves are depressed; Fig. 2 is a bottom plan view of the cornet, parts being broken away; Fig. 3 is a diagrammatic side elevation of the valves in normal position, with an arrow indicating the open tone passage of the wind; Fig. 4 is a detail view of one of the valve casings, showing the tubes connected thereto; Fig. 5 is a detail view of the third piston valve of the series, looking in a direction slightly different from that in which this valve is shown in Fig. 3; and Fig. 6 is a bottom plan view of the third valve casing.

In these drawings, I have shown one embodiment of my invention and have illustrated the same as comprising a series of three valve casings, each of said casings having two series or groups of passages formed in the walls thereof in different horizontal planes, the passages of each group lying in the same horizontal plane and each of said groups of passages containing either an inlet or an outlet passage. These valve casings are here numbered as 1, 2 and 3. A mouth pipe D, extending longitudinally of the instrument, has its lower end bent upon itself, as shown, and connected to the inlet passage in the upper group of passages in the casing 1. A short crook $A'$ connects one of the passages of the upper group in this casing with the corresponding passage in the lower group and forms the open tone crook, i. e., the crook through which the wind passes when the valve within the piston is in its normal or raised position. Another of the passages of the upper group of this same casing is connected to the corresponding passage of the lower group by a longer crook $A^2$ which forms the valve tone passage for the wind, extends longitudinally of the instrument and may, if desired, be provided with a tuning slide, as shown. The remaining passage of the lower group of passages of the casing 1 is the outlet passage and is connected to the inlet passage of the casing 3, which is arranged in the lower group of passages therein, by a bridging tube 4, which preferably lies in a horizontal plane. The open tone passages of the upper and lower groups of the casing 3 are connected by a short crook $C'$ and the valve tone passages of the upper and lower groups, are likewise connected by a longer crook $C^2$, which extends longitudinally of the instrument and may, if desired, be provided with a tuning slide. The outlet passage of the casing 3 is arranged in the upper group of passages of that casing and is connected by tubing 5 with the inlet passage of the casing 2 which is in the upper group of passages of that casing and in a horizontal plane adjacent to, but here shown as slightly higher than, the upper group of passages in the casing 3. This tubing 5 may, if desired, be provided with a tuning slide, as shown at 6. The open tone passages of the upper and lower groups of the casing 2 are connected by a short crook $B'$ and the valve tone passages are connected by a longer crook $B^2$, which preferably extends longitudinally of the instrument and may, if desired, be provided with a tuning slide. The outlet passage for the casing 2 is in the lower group and has connected thereto one end of the bell tube E which extends longitudinally of the instrument in the manner shown.

In each of the valve casings 1, 2 and 3 is mounted a valve piston F having therein two groups of curved ports $F'$ and $F^2$, and $f'$ and $f^2$, as shown in Fig. 5. The valve piston shown in Fig. 5 is the valve piston of the casing 3 and the two groups of ports therein are spaced apart a distance determined by the distance between the upper and lower groups of passages in that casing. The ports in this piston are so arranged that at one end the several ports are in vertical alinement and that the opposite ends of the upper ports and the lower ports, respectively, of the two groups are in vertical alinement. Thus, the ends of the several ports, which are arranged in longitudinal or vertical alinement, are adapted to register with the inlet and outlet passages, respectively, in the casing 3, the ports $f'$ and $F'$ being adapted to register with the inlet and outlet ports, respectively, when the piston is in its normal or elevated position, and the ports $f^2$ and $F^2$ being adapted to register with the inlet and outlet passages of the casing when the valve is in its depressed position. The ends of the ports $f'$ and $F'$ are so arranged as to register with the open tone passages of the lower and upper groups, respectively, which are connected by the crook $C'$, when the piston is in its elevated or normal position and the first-mentioned ports of said piston register with said inlet and said outlet, respectively. The ends of the upper ports of each group, $f^2$ and $F^2$, are so arranged as to register with the valve tone passages of the upper and lower groups, respectively, which are connected by the longer crook $C^2$, when the valve is in its depressed position and the first-mentioned ends of said ports register with the inlet and outlet passages, respectively. As stated, each of these ports has its horizontal axis in a plane at right angles to the direction of the length of the piston and each of these ports is curved to provide the same with the desired acoustical properties set forth in connection with the crooks.

The valves of the casings 1 and 2 are of a similar construction to that of casing 3, differing only in the arrangement of the ports, which arrangement is such as to cause the ends of the same to register with the proper passages in the upper and lower groups of their respective casings, but, in each instance, the ports are arranged with their axes at right angles to the direction of the length of the piston, i. e., in a horizontal plane when the instrument is in playing position, and are at one end arranged in longitudinal or vertical alinement.

With the valve pistons in their normal or elevated position, it will be apparent that the wind will pass through the mouth pipe D into the upper group of passages of the casing 1, through the short crook $A'$, thence through the lower group of passages and the bridging tube 4 to the lower group of passages of the casing 3, thence through the short crook $C'$ to the upper group of passages of that casing, thence through the tubing 5 to the upper group of passages in the casing 2, thence through the short crook B' to the lower group of passages in that casing and thence to the bell tube E. When the valves are all depressed, the course of the wind will be the same as when elevated, except that, in each instance, it will pass through the longer crook of each casing instead of through the shorter one, as above described. It will also be apparent that the air passage through the instrument is without short or angular bends and that the bends with which this passage is provided are so constructed as to provide the same with the desired acoustical properties, i. e., to so construct the same that they will change the direction of a column of air without offering material resistance to its passage and with little or no interference with the vibration thereof, thereby rendering the tone produced by the instrument of a high quality and enabling the same to be played with a uniform effort on the part of the player, and it will be apparent that this result is accomplished by so constructing and arranging the several parts of the instrument as to enable the ports of the several valve pistons to be arranged therein with their axes in planes at right angles to the direction of the length of their respective pistons. It will also be observed that the arrangement of the ports in the piston is such as to enable the same to be shifted from its upper to its lower position with a minimum amount of movement, thus giving a short, quick action to the valve which is very effective and greatly facilitates the operation of the valves; and it will also be observed that the arrangement of the parts is such that the several ports extend through the piston without interfering one with the other, thus providing ports which are uniform throughout their length and are free from obstructions. Again, it will be observed that the arrangement and construction of the several parts of the instrument is such as to permit of the open tone passage and the valve tone passage of each group of passages being arranged at substantially equal distances from the inlet or outlet passage, as the case may be, of that group. Thus the ports connecting the open tone passage and the valve tone passage to the third passage of the group will be of substantially equal curvature. And further, it will be apparent that I have so constructed and arranged the several parts of the instrument as to provide a compact and practical instrument and one having a high degree of efficiency.

I wish it to be understood that I do not desire to be limited to the details of construction shown and described, for obvious modifications will occur to a person skilled in the art.

Having thus described my invention, what I claim as new and desire to secure by Letters Patent, is—

1. In an instrument of the character described, the combination, with a plurality of valve-casings, a mouth-pipe, a bell tube and a valve piston for each casing provided with two pairs of ports, each port passing through the valve piston with its axis in a plane at a right angle to the direction of the length thereof, of two tubes or bends of different lengths for each valve-casing, the tubes or bends of each casing being connected at both ends to said casing, and connections between said casings, each adapted to register with one of the ports in each of the valve pistons of the casings with which it is connected.

2. An instrument of the class described comprising the valve casings 1, 2 and 3, the bell pipe leading from the second casing, the mouth pipe leading to the first casing, the short tube or bend A' and the long tube or bend A² connected with the casing 1, the short tube or bend B' and the long tube or bend B² connected with the second casing, the short tube or bend C' and the long tube or bend C² connected with the 3rd casing, such tubes being connected at their adjacent ends with their respective casings in the same plane transversely of such casings, the tuning slide connected at one end with the third valve casing and at its other end with the second valve casing on the opposite side of the instrument from its connection with the third casing, said slide encircling the first casing in its passage between the second and third casings, and the piston valves operating in their respective casings and having each two pair of ports extending through it with their axes in planes at right angles to its length, the ports of each piston valve opening at one end in alinement with each other and in a line parallel with the axis of such piston valve substantially as and for the purposes set forth.

3. The combination in a cornet or similar instrument, of the first, second and third valve casings, the pairs of tubes for each casing and connected at both their ends with their respective casings with the adjacent ends of the tubes of each pair connected with their casings in the same plane transversely of said casing, a tube connecting the first and third casings, and the tube extending between the third and second casing and encircling the first casing, and the mouth pipe communicating with the first casing and the bell tube leading from the second casing, substantially as set forth.

4. In an instrument of the character described, the combination, with a series of valve casings, a valve piston in each casing provided with ports having their axes in planes at right angles to the direction of the length of said piston, whereby said ports are arranged in parallel transverse planes, of tubes arranged in pairs and adapted to connect said ports, the corresponding ends of each pair being connected with one of said valve casings in a common transverse plane, whereby the wind passage will be without vertical deviation in either position of the valves.

5. An instrument of the character described comprising valve casings, tubes connected thereto and valve pistons mounted in said casings and provided with ports having their axes extending at right angles to the direction of the length of said valve piston and arranged to connect said tubes and to provide for the passage of the wind through each valve the same number of times and in the same plane when the valve is in its open tone or valve tone position.

6. A cornet or similar instrument comprising a series of valve casings, each of said casings having two tubes connected at their opposite ends therewith, and a valve mounted to reciprocate in each of said valve casings and having two pairs of ports extending through the same with their axes in planes at right angles to the direction of the length thereof, the upper ports of each pair being adapted to register with the opposite ends of one of said tubes and the lower port of each pair being adapted to register with the opposite ends of the other tube.

7. A cornet or similar instrument having the first, second and third valve casings, and a tuning slide connected with the third and second valve casings and encircling the first casing, whereby it connects with said third and second casings on opposite sides of the instrument, substantially as described.

8. A cornet or similar instrument comprising a mouth pipe, a bell, a series of valve casings interposed between said pipe and said bell, additional tubing connected to each of said valve casings, and a valve adapted to reciprocate in each of said valve casings and having two pairs of ports extending through the same with their axes in planes at right angles to the direction of its length and adapted to connect said additional tubing with said mouth pipe and said bell.

9. An instrument of the character described comprising a mouth pipe, a bell, a series of valve casings, each casing having two groups of wind passages therein, located in different horizontal planes, the passages of each group being in the same horizontal plane and including an open tone passage and a valve tone passage; an inlet passage in one group of each casing, and an outlet passage in the other group thereof; open tone crooks connecting said open tone passages in each casing; valve tone crooks connecting said valve tone passages in each casing; tubes connecting one of said casings with each of the other casings, and valve pistons in said casings adapted to connect said inlet and said outlet passages with either the open tone crooks or the valve tone crooks.

10. An instrument of the character described comprising a mouth pipe, a bell, a series of valve casings, two groups of passages located in different horizontal planes in each of said casings, the passages of each group being in the same horizontal plane, each group including an open tone and a valve tone passage; one of said valve casings having an inlet passage in the upper group connected to said mouth pipe, and an outlet passage in the lower group; a tube connecting said outlet passage with another casing of said series; a short crook connecting said open-tone passages, a longer crook connecting said valve tone passages, and a valve piston in said casing adapted to connect said inlet and said outlet passages with either said open tone or said valve tone crook.

11. An instrument of the character described comprising a mouth pipe, a bell, a series of valve casings, each having two groups of wind passages located in different horizontal planes, the passages of each group lying in the same horizontal plane, each group including an open tone passage and a valve tone passage; one of said casings having its inlet passage in the same horizontal plane as the outlet passage of one of the remaining casings and its outlet passage in a horizontal plane adjacent to the inlet passage of another of the remaining casings; tubes connecting said inlet and outlet passages; a short crook connecting said open tone passages, a longer crook connecting said valve tone passages; and a valve piston within said casing adapted to connect said inlet and outlet passages with either the open tone crook or the valve tone crook.

12. An instrument of the character described comprising a mouth pipe, a bell, a series of valve casings, each casing having two groups of wind passages located in different horizontal planes, the passages of each group being located in the same horizontal plane, each group including an open tone and a valve tone passage; one of said casings having an inlet passage in the upper group and an outlet passage in the lower group, a tube connecting said inlet passage with an adjacent casing, tubing connecting said outlet passage with said bell, a short crook extending from one side of said casing and connecting the open tone passages, a longer crook extending longitudinally of said instrument and connecting the valve tone passages, and a valve piston in said casing adapted to connect said inlet and said outlet passages with either the open tone or the valve tone crook.

13. In an instrument of the character described, a valve casing provided with two groups of passages, the passages of each group being in a plane extending at right angles to the length of said casing, each group containing an open tone passage and a valve tone passage, one group of said casing containing an inlet passage and the other group of said casing containing an outlet passage, the open tone passage and the valve tone passage of each group being arranged at substantially equal distances from the inlet passage or the outlet passage, as the case may be, of that group.

Z ALBERT MEREDITH.

Witnesses:
   J. E. RANDOLPH,
   B. T. ROWLAND.